US012385408B1

(12) United States Patent
Praisner et al.

(10) Patent No.: US 12,385,408 B1
(45) Date of Patent: Aug. 12, 2025

(54) LIFE AND PERFORMANCE IMPROVEMENT TRENCHES

(71) Applicant: RTX Corporation, Farmington, CT (US)

(72) Inventors: Thomas J. Praisner, Colchester, CT (US); John R. Farris, Lebanon, CT (US); Connor Wiese, State College, PA (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 18/424,109

(22) Filed: Jan. 26, 2024

(51) Int. Cl.
*F01D 11/08* (2006.01)
*F01D 11/24* (2006.01)
*F04D 29/52* (2006.01)
*F04D 29/68* (2006.01)

(52) U.S. Cl.
CPC .............. *F01D 11/08* (2013.01); *F01D 11/24* (2013.01); *F04D 29/526* (2013.01); *F04D 29/681* (2013.01); *F04D 29/685* (2013.01); *F05D 2220/32* (2013.01); *F05D 2240/55* (2013.01)

(58) Field of Classification Search
CPC ........ F01D 11/08; F01D 11/24; F04D 29/685; F04D 29/681; F04D 29/526; F05D 2240/11; F05D 2240/81
See application file for complete search history.

(56) References Cited

U.S. PATENT DOCUMENTS 4,239,452 A * 12/1980 Roberts, Jr. ............. F01D 11/12 415/173.5
4,767,266 A 8/1988 Holz et al.
5,308,225 A * 5/1994 Koff ......................... F01D 11/08 415/58.7
5,632,598 A * 5/1997 Maier ...................... F01D 5/225 415/173.5
6,155,778 A * 12/2000 Lee .......................... F01D 11/08 415/173.1
6,231,301 B1 * 5/2001 Barnett ................. F04D 29/526 415/58.7
6,350,102 B1 * 2/2002 Bailey ..................... F01D 11/02 415/173.5
6,568,909 B2 * 5/2003 Szucs ........................ F01D 5/20 29/889.7

(Continued)

OTHER PUBLICATIONS

Extended European Search Report dated May 16, 2025, for corresponding European Patent Application No. 24215541.4-1009, 10 pgs.

*Primary Examiner* — Woody A Lee, Jr.
*Assistant Examiner* — Behnoush Haghighian
(74) *Attorney, Agent, or Firm* — Kinney & Lange, P.A.

(57) ABSTRACT

A blade outer air seal assembly includes a plurality of seal segments circumferentially disposed about an array of blades rotatable about an axis, each of the plurality of seal segments having a radially inner surface facing a tip of each blade of the array of blades, the radially inner surface having an arrangement of trenches formed therein, and a radially outer surface opposite the radially inner surface. The arrangement of trenches is disposed between 30% and 80% of a chord of a blade of the array of blades as taken at the respective tip, and the arrangement of trenches is aperiodic in the axial direction.

20 Claims, 4 Drawing Sheets

(56) References Cited

U.S. PATENT DOCUMENTS

| | | | | | |
|---|---|---|---|---|---|
| 7,210,905 | B2 * | 5/2007 | Lapworth | F04D 27/0207 | 415/220 |
| 7,645,121 | B2 * | 1/2010 | Tudor | F04D 29/667 | 415/220 |
| 8,337,146 | B2 * | 12/2012 | Yu | F04D 29/685 | 415/173.1 |
| 8,419,355 | B2 * | 4/2013 | Guemmer | F04D 29/685 | 415/173.1 |
| 8,475,122 | B1 | 7/2013 | Liang | | |
| 8,550,768 | B2 * | 10/2013 | Montgomery | F04D 29/685 | 415/57.1 |
| 8,777,558 | B2 * | 7/2014 | Brunet | F04D 29/685 | 415/173.1 |
| 8,845,269 | B2 * | 9/2014 | Agneray | F04D 27/0207 | 415/220 |
| 8,915,699 | B2 * | 12/2014 | Brignole | F04D 29/526 | 415/914 |
| 8,939,705 | B1 * | 1/2015 | Lee | F01D 11/08 | 415/173.1 |
| 8,939,706 | B1 * | 1/2015 | Lee | F01D 9/041 | 415/173.1 |
| 8,939,707 | B1 * | 1/2015 | Lee | F01D 11/12 | 415/173.1 |
| 8,939,716 | B1 * | 1/2015 | Lee | F01D 11/08 | 415/173.1 |
| 9,004,859 | B2 * | 4/2015 | Shahpar | F01D 25/24 | 415/220 |
| 9,004,861 | B2 * | 4/2015 | Nash | F01D 5/20 | 416/97 R |
| 9,151,175 | B2 * | 10/2015 | Tham | F01D 5/187 | |
| 9,243,511 | B2 * | 1/2016 | Lee | F01D 25/24 | |
| 9,249,680 | B2 * | 2/2016 | Lee | F01D 11/08 | |
| 9,574,455 | B2 * | 2/2017 | McCaffrey | F01D 25/12 | |
| 9,896,952 | B2 * | 2/2018 | Matsumoto | F01D 11/001 | |
| 9,982,554 | B2 * | 5/2018 | Perrot | F01D 11/122 | |
| 10,006,292 | B2 * | 6/2018 | Kuwamura | F01D 11/08 | |
| 10,047,620 | B2 * | 8/2018 | Giacché | F04D 29/685 | |
| 10,066,640 | B2 * | 9/2018 | Bennington | F04D 29/321 | |
| 10,189,082 | B2 * | 1/2019 | Tham | B32B 15/14 | |
| 10,190,435 | B2 * | 1/2019 | Lee | F01D 11/122 | |
| 10,309,243 | B2 * | 6/2019 | McCaffrey | F01D 9/02 | |
| 10,323,534 | B2 * | 6/2019 | McCaffrey | F01D 11/127 | |
| 10,443,425 | B2 * | 10/2019 | Romanov | F01D 11/24 | |
| 10,465,716 | B2 * | 11/2019 | Vo | F04D 29/526 | |
| 10,539,154 | B2 * | 1/2020 | Mallina | F04D 29/685 | |
| 10,648,484 | B2 * | 5/2020 | Gentry | F01D 5/20 | |
| 10,823,194 | B2 * | 11/2020 | Jothiprasad | F01D 5/143 | |
| 10,830,082 | B2 * | 11/2020 | Subramaniyan | F01D 11/08 | |
| 10,876,423 | B2 * | 12/2020 | Reynolds | F04D 29/384 | |
| 10,914,318 | B2 * | 2/2021 | Capozzi | F04D 29/526 | |
| 10,954,810 | B2 * | 3/2021 | Binek | B22F 5/009 | |
| 11,015,465 | B2 * | 5/2021 | Reynolds | F01D 9/04 | |
| 11,078,805 | B2 * | 8/2021 | Joly | F04D 29/526 | |
| 11,098,731 | B2 * | 8/2021 | Gentry | F01D 5/20 | |
| 11,346,367 | B2 * | 5/2022 | Yu | F04D 29/681 | |
| 11,421,544 | B2 * | 8/2022 | Reynolds | F04D 29/526 | |
| 2005/0111968 | A1 * | 5/2005 | Lapworth | F04D 29/685 | 415/182.1 |
| 2007/0147989 | A1 * | 6/2007 | Collins | F01D 11/02 | 415/173.1 |
| 2007/0160459 | A1 * | 7/2007 | Tudor | F04D 29/526 | 415/119 |
| 2008/0044273 | A1 * | 2/2008 | Khalid | F04D 29/321 | 415/57.4 |
| 2011/0299979 | A1 * | 12/2011 | Montgomery | F04D 29/526 | 415/182.1 |
| 2012/0201671 | A1 | 8/2012 | Shahpar et al. | | |
| 2014/0017072 | A1 * | 1/2014 | McCaffrey | F01D 11/24 | 415/173.1 |
| 2016/0153360 | A1 * | 6/2016 | Jothiprasad | F01D 25/24 | 415/173.1 |
| 2016/0230776 | A1 * | 8/2016 | Bennington | F04D 29/685 | |
| 2017/0051624 | A1 | 2/2017 | Romanov et al. | | |
| 2017/0122120 | A1 * | 5/2017 | McCaffrey | F01D 11/127 | |
| 2017/0211404 | A1 | 7/2017 | Mccaffrey et al. | | |
| 2017/0328377 | A1 * | 11/2017 | Mallina | F02C 3/04 | |
| 2018/0231023 | A1 * | 8/2018 | Gentry | F01D 5/20 | |
| 2019/0368369 | A1 * | 12/2019 | Liang | F01D 25/005 | |
| 2020/0182259 | A1 * | 6/2020 | Gentry | F04D 29/321 | |
| 2020/0224675 | A1 * | 7/2020 | Capozzi | F04D 29/685 | |
| 2020/0308970 | A1 * | 10/2020 | Reynolds | F04D 29/526 | |
| 2020/0325790 | A1 * | 10/2020 | Joly | F04D 29/685 | |
| 2021/0033108 | A1 * | 2/2021 | Yu | F04D 29/681 | |
| 2023/0151825 | A1 * | 5/2023 | Shi | F04D 29/541 | 415/220 |
| 2023/0279394 | A1 * | 9/2023 | Belew | A61P 7/00 | 514/44 R |

* cited by examiner

LIFE AND PERFORMANCE IMPROVEMENT TRENCHES

STATEMENT OF GOVERNMENT INTEREST

This invention was made with government support under Contract No. 80NSSC21M0068 awarded by National Aeronautics and Space Administration. The government has certain rights in the invention.

BACKGROUND

The present disclosure relates generally to gas turbine engines and more particularly to sealing of rotor blades within gas turbine engines.

Gas turbine engines typically include a compressor section, a combustor section, and a turbine section. During operation, air is pressurized in the compressor section and is mixed with fuel and burned in the combustor section to generate hot combustion gases. The hot combustion gases are communicated through the turbine section, which extracts energy from the hot combustion gases to power the compressor section and other gas turbine engine loads.

The compressor and turbine sections of a gas turbine engine include alternating rows of rotating blades and stationary vanes. The turbine blades rotate and extract energy from the hot combustion gases that are communicated through the gas turbine engine. The turbine vanes prepare the airflow for the next set of blades. The vanes extend from platforms that may be contoured to manipulate flow.

An outer casing of an engine static structure may include one or more blade outer air seals (BOAS) that provide an outer radial flow path boundary for the hot combustion gases. The BOAS are arranged circumferentially adjacent to each other and meet at mate faces. The tips of rotating blades seal against radially inner faces of the BOAS. Complex BOAS geometries have been developed to enhance sealing interfaces between the BOAS and the blade tips. Cooling these complex geometries is often difficult.

SUMMARY

A blade outer air seal assembly includes a plurality of seal segments circumferentially disposed about an array of blades rotatable about an axis, each of the plurality of seal segments having a radially inner surface facing a tip of each blade of the array of blades, the radially inner surface having an arrangement of trenches formed therein, and a radially outer surface opposite the radially inner surface. The arrangement of trenches is disposed between 30% and 80% of a chord of a blade of the array of blades as taken at the respective tip, and the arrangement of trenches is aperiodic in the axial direction.

A gas turbine engine section includes a disk supporting an array of blades, the array of blades rotatable about an axis, a casing radially outward from the array of blades, and a blade outer air seal disposed between the casing and the array of blades. The blade outer air seal assembly includes a plurality of seal segments circumferentially disposed about an array of blades rotatable about an axis, each of the plurality of seal segments having a radially inner surface facing a tip of each blade of the array of blades, the radially inner surface having an arrangement of trenches formed therein, and a radially outer surface opposite the radially inner surface. The arrangement of trenches is disposed between 30% and 80% of a chord of a blade of the array of blades as taken at the respective tip, and the arrangement of trenches is aperiodic in the axial direction.

Figure 1:
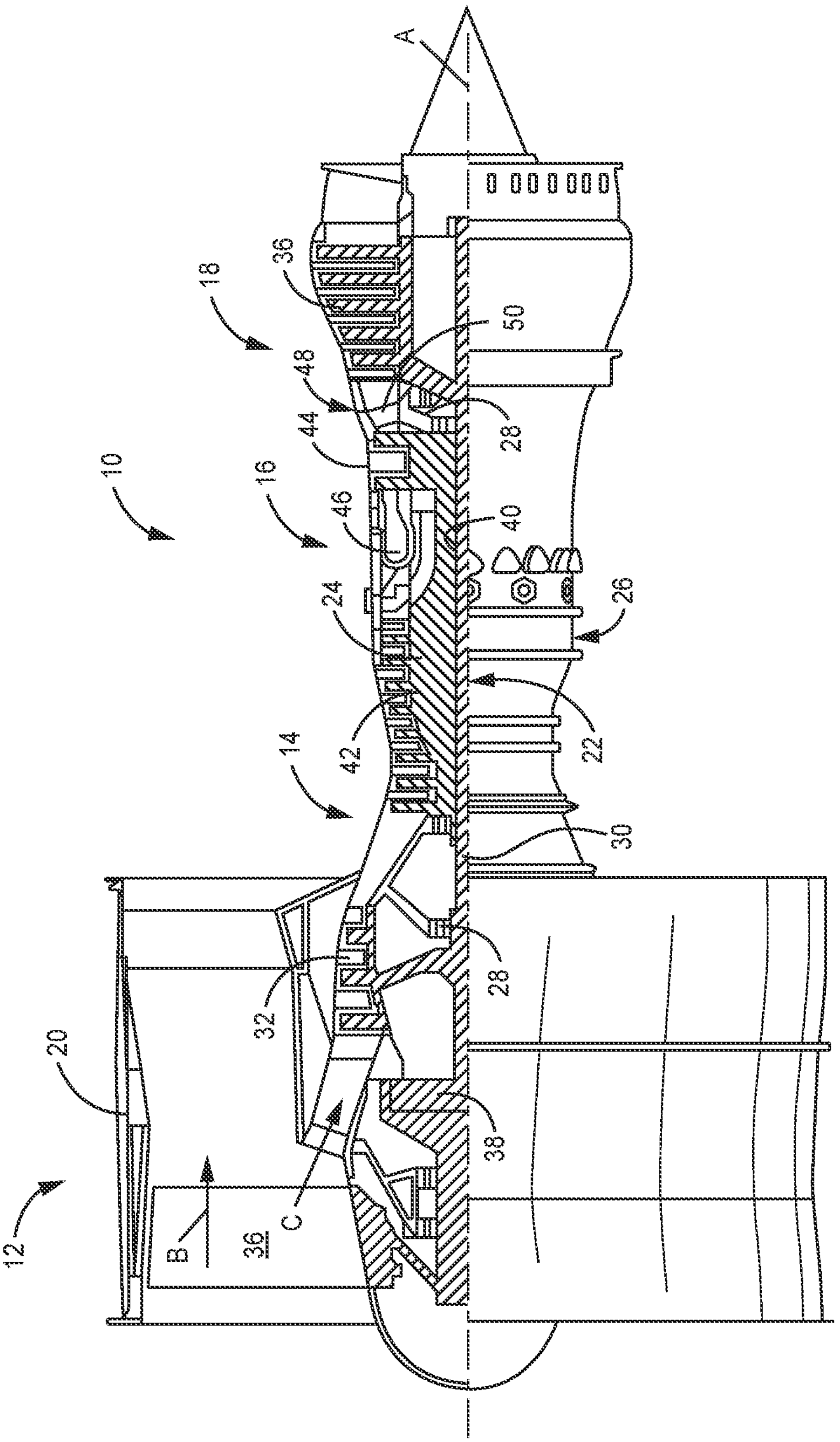
FIG. 1 is a simplified cross-sectional illustration of an exemplary gas turbine engine.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

FIG. 1 is a simplified cross-sectional view of gas turbine engine 10. Gas turbine engine 10 is disclosed herein as a two-spool turbofan that generally incorporates fan section 12, a compressor section 14, combustor section 16, and turbine section 18. Fan section 12 drives air along bypass flow path B in a bypass duct defined within housing 20, such as a fan case or nacelle, and also drives air along core flow path C for compression and communication into combustor section 16 then expansion through turbine section 18. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 10 generally includes low speed spool 22 and high-speed spool 24 mounted for rotation about an engine central longitudinal axis A relative to engine static structure 26 via several bearing systems 28. It should be understood that various bearing systems 28 at various locations may alternatively or additionally be provided, and the location of bearing systems 28 may be varied as appropriate to the application.

Low speed spool 22 generally includes inner shaft 30 that interconnects, a first (or low) pressure compressor 32 and a first (or low) pressure turbine 34. Inner shaft 30 is connected to fan 36 through a speed change mechanism, which in exemplary gas turbine engine 10 is illustrated as geared architecture (i.e., fan drive gear system) 38 to drive fan 36 at a lower speed than low speed spool 22. High-speed spool 24 includes outer shaft 40 that interconnects a second (or high) pressure compressor 42 and a second (or high) pressure turbine 44. Combustor 46 is arranged in the exemplary gas turbine 10 between high-pressure compressor 42 and high-pressure turbine 44. Mid-turbine frame 48 of engine static structure 26 may be arranged generally between high-pressure turbine 44 and low-pressure turbine 34. Mid-turbine frame 48 further supports bearing systems 28 in the turbine section 18. Inner shaft 30 and outer shaft 40 are concentric and rotate via bearing systems 28 about the engine central longitudinal axis A which is collinear with their longitudinal axes.

The core airflow is compressed by low-pressure compressor 32 then high-pressure compressor 42, mixed and burned with fuel in combustor 46, then expanded through high-pressure turbine 44 and low-pressure turbine 34. Mid-turbine frame 48 includes airfoils 50 which are in core airflow path C. Turbines 34, 44 rotationally drive the respective low speed spool 22 and high-speed spool 24 in response to the expansion. It will be appreciated that each of the positions of fan section 12, compressor section 14, combustor section 16, turbine section 18, and fan drive gear system 38 may be varied. For example, fan drive gear system 38 may be located aft of low-pressure compressor 32, aft of combustor section 16, or even aft of turbine section 18, and fan 36 may be positioned forward or aft of the location of fan drive gear system 38.

Engine 10 in one example is a high bypass geared aircraft engine. In a further example, the engine bypass ratio is greater than about six (6), with an example embodiment being greater than about ten (10), and can be less than or equal to about 18.0, or more narrowly can be less than or equal to 16.0. The geared architecture of fan drive gear system 38 is an epicyclic gear train, such as a planetary gear system or other gear system, with a gear reduction ratio of greater than about 2.3. The gear reduction ratio may be less than or equal to 4.0. Low-pressure turbine 34 has a pressure ratio that is greater than about five. The low-pressure turbine pressure ratio can be less than or equal to 13.0, or more narrowly less than or equal to 12.0. In one disclosed embodiment, engine bypass ratio is greater than about ten (10:1), the diameter of fan 36 is significantly larger than that of low-pressure compressor 32, and low-pressure turbine 34 has a pressure ratio that is greater than about five 5:1. The low-pressure turbine pressure ratio is pressure measured prior to an inlet of low-pressure turbine 34 as related to the pressure at the outlet of low-pressure turbine 34 prior to an exhaust nozzle. It should be understood, however, that the above parameters are only exemplary of one embodiment of a geared architecture engine and that the present invention is applicable to other gas turbine engines including direct drive turbofans.

A significant amount of thrust is provided by bypass flow B due to the high bypass ratio. Fan section 12 of engine 10 is designed for a particular flight condition, typically cruise at about 0.8 Mach and about 35,000 feet (10,668 meters). The flight condition of 0.8 Mach and 35,000 ft (10,668 meters), with engine 10 at its best fuel consumption—also known as "bucket cruise Thrust Specific Fuel Consumption ('TSFC')"—is the industry standard parameter of lbm of fuel being burned divided by lbf of thrust engine 10 produces at that minimum point. The engine parameters described above and those in this paragraph are measured at this condition unless otherwise specified. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45, or more narrowly greater than or equal to 1.25. "Low corrected fan tip speed" is the actual fan tip speed in ft/sec divided by an industry standard temperature correction of $[(\text{Tram } ° \text{R})/(518.7° \text{R})]^{0.5}$. The "Low corrected fan tip speed" as disclosed herein according to one non-limiting embodiment is less than about 1150.0 ft/second (350.5 meters/second), and can be greater than or equal to 1000.0 ft/second (304.8 meters/second).

Figure 2:
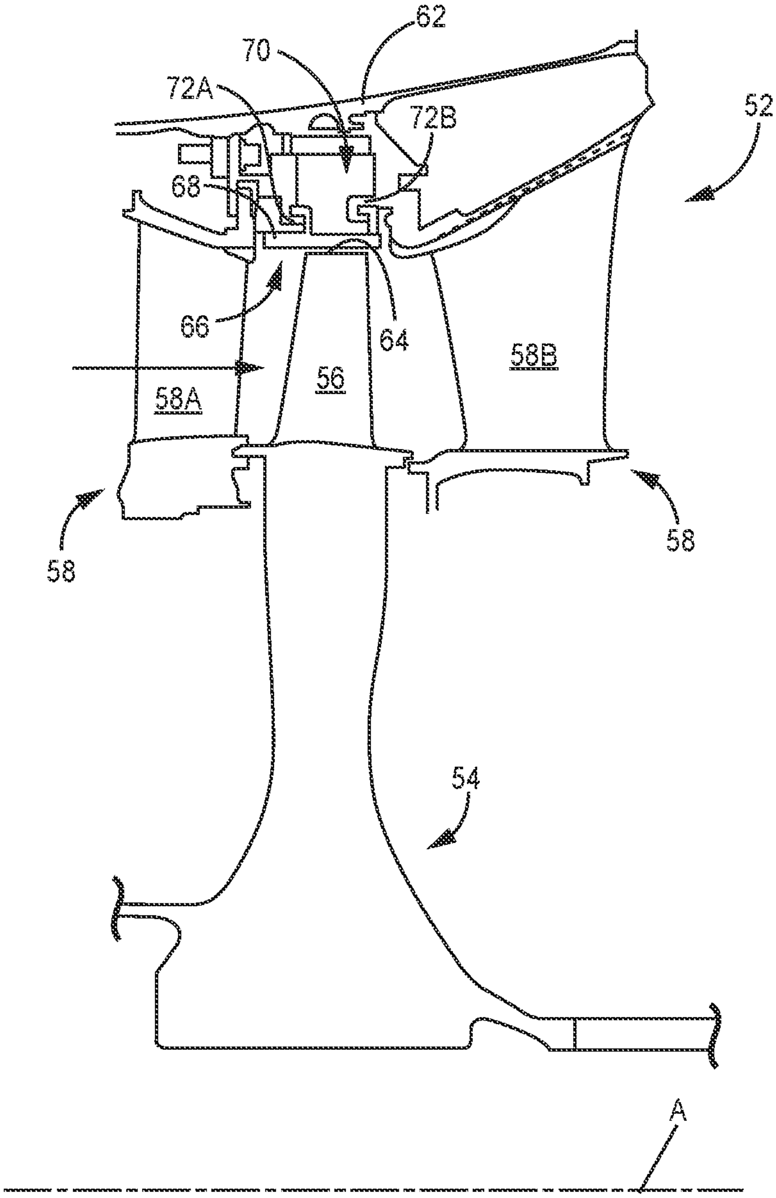
FIG. 2 is a simplified cross-sectional illustration of a section of a gas turbine engine.

FIG. 2 illustrates portion 52 of a gas turbine engine, such as the gas turbine engine 10 of FIG. 1. In this exemplary embodiment, portion 52 represents a portion of high-pressure turbine 44. However, it should be understood that other portions of gas turbine engine 10 could benefit from the teachings of this disclosure, including but not limited to, compressor section 14 and low-pressure turbine 34.

Portion 52 can include rotor disk 54 (only one shown) mounted to outer shaft 40 rotatable as a unit with respect to engine static structure 26. Portion 52 can include alternating rows of rotating blades 56 (mounted to rotor disk 54) and vanes 58A and 58B of vane assemblies 58 that are also supported within outer casing 62 of engine static structure 26.

Each blade 56 of rotor disk 54 includes a tip 64 positioned at a radially outermost portion of a respective blade 56. Blade tips 64 extend toward blade outer air seal (BOAS) assembly 66. BOAS assembly 66 may find beneficial use in many industries including aerospace, industrial, electricity generation, naval propulsion, pumps for gas and oil transmission, aircraft propulsion, vehicle engines and stationery power plants. BOAS assembly 66 is disposed in an annulus radially between the outer casing 62 and blade tips 64. BOAS assembly 66 generally includes a multitude of BOAS segments 68 (only one shown in FIG. 2) arranged to form a full ring hoop assembly encircling associated blades 56 of a respective stage of portion 52. Cavity 70 extends axially between the forward flange 72A and the aft flange 72B and radially between outer casing 62 and BOAS segments 68. A secondary cooling airflow may be communicated into cavity 70 to provide a dedicated source of cooling airflow for cooling BOAS segments 68. The secondary cooling airflow can be sourced from high-pressure compressor 42 or any other upstream portion of the gas turbine engine 10.

Figure 3:
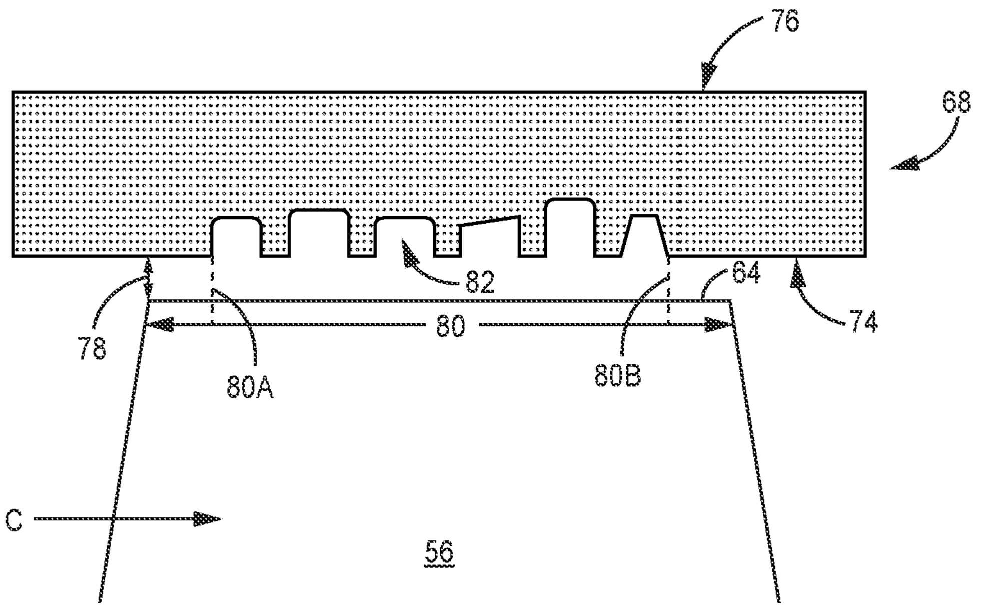
FIG. 3 is a simplified cross-sectional illustration of a blade and blade outer air seal segment from the section of FIG. 2.

FIG. 3 is a simplified cross-sectional illustration showing BOAS segment 68 and blade 56 near tip 64. Segment 68 includes radially inner surface 74 facing tip 64, and oppositely disposed radially outer surface 76. A tip clearance gap 78 exists between tip 64 and radially inner surface 74. Chord line 80 represents the chordal dimension of blade 56 proximate tip 64.

As shown in FIG. 3, multiple circumferentially extending trenches (or grooves) 82 are formed in radially inner surface 74 opposite tip 64. In general, trenches 82 can help decrease leakage flow over tip 64 to improve engine efficiency and reduce heating of tip 64, among other benefits. The forward (i.e., upstream)-most trench 82 can begin at approximately 30% chord, represented by chord position line 80A, and the aft (i.e., downstream)-most trench 82 can terminate at approximately 80% chord, represented by chord position line 80B. As such, trenches 82 are generally disposed between 30% to 80% chord, relative to chord line 80. Moreover, in the embodiments discussed herein, there will generally be no trenches disposed at the leading edge of blade 56 (i.e., 0% to about 10% of chord line 80), or at the trailing edge of blade 56 (i.e., about 90% to 100% of chord line 80). The number of trenches 82 can be about four trenches to eight trenches, inclusive, in an exemplary embodiment, with six trenches 82 being shown in FIG. 3. Further, trenches 82 are geometrically and/or dimensionally axially aperiodic (i.e., irregular, non-repeating, etc.), as is discussed in greater detail below with respect to FIG. 4.

Figure 4:
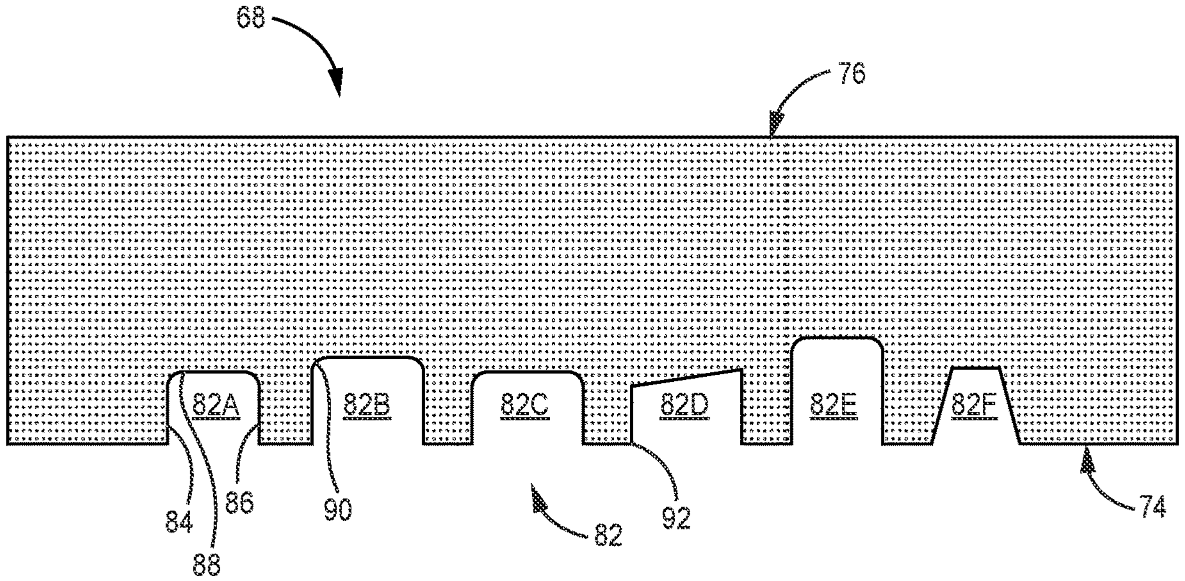
FIG. 4 is a simplified cross-sectional illustration showing the blade outer air seal segment in greater detail.

FIG. 4 is a simplified illustration of segment 68 showing trenches 82 in greater detail. In FIG. 4, trenches 82 are individually labeled 82A-82F, but will be collectively or generically referred to as trenches 82. Each trench 82 can include an upstream surface 84, a downstream surface 86 generally disposed along the y-axis (i.e., the radial direction), and an upper surface 88 generally disposed along the x-axis (i.e., the axial direction/axis A). As shown in FIG. 4, surfaces 84, 86, and 88 are labeled only in forwardmost trench 82A. Each trench 82 further has a width, defined by the distance between a respective upstream surface 84 and downstream surface 86, and a height defined by the distance from a position flush with radially inner surface 74 of segment and a respective upper surface 88. The width of a given trench 82 can be constant if upstream surface 84 and downstream surface 86 are parallel (e.g., trench 82A), or varied if upstream surface 84 and downstream surface 86 are not parallel (e.g., trench 82F). Similarly, the height of a given trench 82 can be constant if upper surface 88 is parallel with radially inner surface 74 of segment 68 (e.g., trench 82A), or varied if upper surface 88 is not parallel to (i.e., angled with respect to) radially inner surface 74 (e.g., trench 82D). As such, any of surfaces 84, 86, or 88 can be angled with respect to one another and/or radially inner surface 74 of segment 68. This can include trenches 82 which are entirely angled/canted with respect to radially inner surface 74. Any of surfaces 84, 86, 88, can also be straight, curved/rounded, or combinations thereof. For example, trenches 82A, 82B, and 82E have rounded upper corners 90 (one is labeled in trench 82B) transitioning from respective upper surfaces 88 to respective upstream surfaces 84 and downstream surfaces 86. Trench 82C is an example with different upper corners 90, that is, with one rounded upper corner 90 and one non-rounded upper corner 90. Lower (i.e., radially inner) corners 92, that is, corners formed at radially inner surface 74 of segment 68 will generally be straight/sharp (i.e., formed by two straight segments) and not rounded.

As noted above, trenches 82 can be aperiodically arranged in the axial direction. In general, each trench will be different from at least a neighboring (i.e., the immediate upstream or downstream) trench 82 in cross-sectional geometry (defined by the x-y plane) or in at least one dimension (i.e., width or height). For example, trench 82A and trench 82B have substantially similar cross-sectional geometries defined, in part, by rounded upper corners 90, but can have different dimensions (e.g., heights). Other trenches 82 can differ in both cross-sectional geometry and dimensions (e.g., trenches 82E and 82F).

For a given segment 68, the aperiodic arrangement can be determined using software-based optimization based on such factors as blade stage (e.g., first or second) and/or engine section (e.g., turbine or compressor). Such modeling can also determine the optimal number of trenches (e.g., four to eight) and position of trenches (e.g., from 30% to 80% along chord line 80). It has been observed through such modeling that relatively wider trenches 82 can be preferable at the mid-chord region from about 40% to 60% of chord line 80. It has further been observed that rounded upper corners 90 and non-rounded lower corners 92 are preferable.

The disclosed aperiodic trenches can be used with a variety of BOAS segments and blades, including those formed form metallics or reinforced composites (e.g., ceramic matrix composites), in turbine or compressor sections, with various tip clearances, and even with blades having squealer tips. The disclosed aperiodic trenches have applications in both commercial and military turbines.

Discussion of Possible Embodiments

The following are non-exclusive descriptions of possible embodiments of the present invention.

A blade outer air seal assembly includes a plurality of seal segments circumferentially disposed about an array of blades rotatable about an axis, each of the plurality of seal segments having a radially inner surface facing a tip of each blade of the array of blades, the radially inner surface having an arrangement of trenches formed therein, and a radially outer surface opposite the radially inner surface. The arrangement of trenches is disposed between 30% and 80% of a chord of a blade of the array of blades as taken at the respective tip, and the arrangement of trenches is aperiodic in the axial direction.

The assembly of the preceding paragraph can optionally include, additionally and/or alternatively, any one or more of the following features, configurations and/or additional components:

In the above assembly, the arrangement of trenches can include four trenches to eight trenches.

In any of the above assemblies, each trench of the arrangement of trenches can have a width defined by an upstream surface and a downstream surface.

In any of the above assemblies, for a first trench of the arrangement of trenches, the width can be constant, and for a second trench of the arrangement of trenches, the width can be varied.

In any of the above assemblies, each trench of the arrangement of trenches can have a height defined by an upper surface and the radially inner surface of a respective seal segment.

In any of the above assemblies, for a first trench of the arrangement of trenches, the height can be constant, and for a second trench of the arrangement of trenches, the height can be varied.

In any of the above assemblies, each trench of the arrangement of trenches can have a pair of upper corners and a pair of lower corners.

In any of the above assemblies, for a first trench the arrangement of trenches, one corner of the pair of upper corners can be rounded.

In any of the above assemblies, for a second trench the arrangement of trenches, both corners of the pair of upper corners can be rounded.

In any of the above assemblies, each corner of the pair of lower corners can be straight.

In any of the above assemblies, the array of blades can be located in a turbine section of the gas turbine engine.

A gas turbine engine section includes a disk supporting an array of blades, the array of blades rotatable about an axis, a casing radially outward from the array of blades, and a blade outer air seal disposed between the casing and the array of blades. The blade outer air seal assembly includes a plurality of seal segments circumferentially disposed about an array of blades rotatable about an axis, each of the plurality of seal segments having a radially inner surface facing a tip of each blade of the array of blades, the radially inner surface having an arrangement of trenches formed therein, and a radially outer surface opposite the radially inner surface. The arrangement of trenches is disposed between 30% and 80% of a chord of a blade of the array of blades as taken at the respective tip, and the arrangement of trenches is aperiodic in the axial direction.

The section of the preceding paragraph can optionally include, additionally and/or alternatively, any one or more of the following features, configurations and/or additional components:

In the above section, the arrangement of trenches can include four trenches to eight trenches.

In any of the above sections, each trench of the arrangement of trenches can have a width defined by an upstream surface and a downstream surface.

In any of the above sections, for a first trench of the arrangement of trenches, the width can be constant, and for a second trench of the arrangement of trenches, the width can be varied.

In any of the above sections, each trench of the arrangement of trenches can have a height defined by an upper surface and the radially inner surface of a respective seal segment.

In any of the above sections, for a first trench of the arrangement of trenches, the height can be constant, and for a second trench of the arrangement of trenches, the height can be varied.

In any of the above sections, each trench of the arrangement of trenches can have a pair of upper corners and a pair of lower corners.

In any of the above sections, for a first trench the arrangement of trenches, one corner of the pair of upper corners can be rounded.

In any of the above sections, the array of blades can be located in a turbine section of the gas turbine engine.

While the invention has been described with reference to an exemplary embodiment(s), it will be understood by those skilled in the art that various changes may be made, and equivalents may be substituted, for elements thereof, without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A blade outer air seal assembly comprising:
- a plurality of seal segments circumferentially disposed about an array of blades rotatable about an axis, each of the plurality of seal segments comprising:
  - a radially inner surface facing a tip of each blade of the array of blades, the radially inner surface having an arrangement of trenches formed therein; and
  - a radially outer surface opposite the radially inner surface,
  - wherein the arrangement of trenches is disposed between 30% and 80% of a chord of a blade of the array of blades as taken at the respective tip; and
  - wherein the arrangement of trenches is aperiodic in the axial direction, wherein trenches disposed between 40% to 60% of the chord of the blade are wider than trenches disposed outside thereof.

2. The assembly of claim 1, wherein the arrangement of trenches comprises four trenches to eight trenches.

3. The assembly of claim 2, wherein each trench of the arrangement of trenches has a width defined by an upstream surface and a downstream surface.

4. The assembly of claim 3, wherein for a first trench of the arrangement of trenches, the width is constant, and wherein for a second trench of the arrangement of trenches, the width is varied.

5. The assembly of claim 3, wherein each trench of the arrangement of trenches has a height defined by an upper surface and the radially inner surface of a respective seal segment.

6. The assembly of claim 5, wherein for a first trench of the arrangement of trenches, the height is constant, and wherein for a second trench of the arrangement of trenches, the height is varied.

7. The assembly of claim 5, wherein each trench of the arrangement of trenches has a pair of upper corners and a pair of lower corners.

8. The assembly of claim 7, wherein for a first trench of the arrangement of trenches, one corner of the pair of upper corners is rounded.

9. The assembly of claim 8, wherein for a second trench of the arrangement of trenches, both corners of the pair of upper corners are rounded.

10. The assembly of claim 7, wherein each corner of the pair of lower corners is straight.

11. The assembly of claim 1, wherein the array of blades is located in a turbine section of the gas turbine engine.

12. A gas turbine engine section comprising:
- a disk supporting an array of blades, the array of blades rotatable about an axis;
- a casing radially outward from the array of blades; and
- a blade outer air seal assembly disposed between the casing and the array of blades, the blade outer air seal assembly comprising:
  - a plurality of seal segments circumferentially disposed about the array of blades, each of the plurality of seal segments comprising:
    - a radially inner surface facing a tip of each blade of the array of blades, the radially inner surface having an arrangement of trenches formed therein; and
    - a radially outer surface opposite the radially inner surface,
  - wherein the arrangement of trenches is disposed between 30% and 80% of a chord of a blade of the array of blades as taken at the respective tip; and
  - wherein the arrangement of trenches is aperiodic in the axial direction, wherein trenches disposed between 40% to 60% of the chord of the blade are wider than trenches disposed outside thereof.

13. The section of claim 12, wherein the arrangement of trenches comprises four trenches to eight trenches.

14. The section of claim 13, wherein each trench of the arrangement of trenches has a width defined by an upstream surface and a downstream surface.

15. The section of claim 14, wherein for a first trench of the arrangement of trenches, the width is constant, and wherein for a second trench of the arrangement of trenches, the width is varied.

16. The section of claim 14, wherein each trench of the arrangement of trenches has a height defined by an upper surface and the radially inner surface of a respective seal segment.

17. The section of claim 16, wherein for a first trench of the arrangement of trenches, the height is constant, and wherein for a second trench of the arrangement of trenches, the height is varied.

18. The section of claim 16, wherein each trench of the arrangement of trenches has a pair of upper corners and a pair of lower corners.

19. The section of claim 18, wherein for a first trench of the arrangement of trenches, one corner of the pair of upper corners is rounded.

20. The section of claim 12, wherein the array of blades is located in a turbine section of the gas turbine engine.

* * * * *